US008717315B2

(12) United States Patent
Kao et al.

(10) Patent No.: US 8,717,315 B2
(45) Date of Patent: May 6, 2014

(54) TOUCH-CONTROL SYSTEM AND TOUCH-SENSING METHOD THEREOF

(75) Inventors: Ming-Tsan Kao, Hsinchu (TW); Hsin-Chi Cheng, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 802 days.

(21) Appl. No.: 12/899,234

(22) Filed: Oct. 6, 2010

(65) Prior Publication Data

US 2011/0080363 A1    Apr. 7, 2011

Related U.S. Application Data

(60) Provisional application No. 61/249,252, filed on Oct. 6, 2009.

(30) Foreign Application Priority Data

Feb. 26, 2010   (TW) ............................... 99105701 A

(51) Int. Cl.
   *G06F 3/041*   (2006.01)
(52) U.S. Cl.
   USPC ............................ 345/173; 345/174; 345/158
(58) Field of Classification Search
   USPC ........................... 345/173, 158, 174, 175, 179
   See application file for complete search history.

(56) References Cited

U.S. PATENT DOCUMENTS

| 6,498,602 | B1* | 12/2002 | Ogawa ........................ 345/173 |
| 2008/0122792 | A1* | 5/2008 | Izadi et al. ................... 345/173 |
| 2009/0128516 | A1 | 5/2009 | Rimon et al. |
| 2010/0097343 | A1 | 4/2010 | Fang |
| 2010/0214231 | A1 | 8/2010 | D'Souza et al. |
| 2010/0295816 | A1 | 11/2010 | Zhang |
| 2012/0280929 | A1* | 11/2012 | Rimon et al. ................. 345/173 |

* cited by examiner

*Primary Examiner* — Ariel Balaoing
*Assistant Examiner* — Robert Michaud
(74) *Attorney, Agent, or Firm* — WPAT, PC; Justin King

(57) ABSTRACT

An exemplary touch-control system and an exemplary touch-sensing method thereof are provided. The touch-control system comprises a touch-control panel, at least an image sensing apparatus and a processing circuit. The touch-control panel has a touch surface and adopts a touch-sensing structure. The touch-sensing structure comprises at least a plurality of conducting wires paralleled to each other. The image sensing apparatus is used for sensing an image of the touch surface. When two pointers touch the touch surface, the processing circuit acquires the information related to the positions of the pointers in the touch surface by the conducting wires and the processing circuit, so as to acquire the actual touch positions of the pointers according to the sensing results of the two sensing manners.

18 Claims, 11 Drawing Sheets sensing a first pointer and a second pointer by the first conducting wires and the second conducting wires to acquire possible touch positions of the pointers to regard the possible touch positions as a first sensing result and calculating possible touch positions of the pointers according to the pointer images sensed by the first image sensing apparatus and the second image sensing apparatus to regard the possible touch positions as a second sensing result when the first pointer and the second pointer touch the touch surface ~S502 acquiring an intersection of the first sensing result and the second sensing result and regarding the intersection as the actual touch positions of the pointers ~S504

FIG. 5 sensing a first pointer and a second pointer by the first conducting wires to acquire the one-dimensional coordinates of the pointers to regard the one-dimensional coordinates as a first sensing result and calculating possible touch positions of the pointers according to the pointer images sensed by the first image sensing apparatuses and the second image sensing apparatuses to regard the possible touch positions as a second sensing result when a first pointer and a second pointer touch the touch surface ~S702 acquiring an intersection of the first sensing result and the second sensing result to regard the intersection as the actual touch positions of the pointers ~S704

FIG. 7 sensing a first pointer and a second pointer by the first conducting wires and the second conducting wires to acquire the possible touch positions of the pointers to regard the possible touch positions as a first sensing result and calculating the positions of the pointer images in the image sensing window of the image sensing apparatus to regard the positions of the pointer images as a second sensing result when the two pointers touch the touch surface ~S902 acquiring the intersection of the first sensing result and the second sensing result, so as to regard the intersection as the actual touch positions of the pointers ~S904

FIG. 9 sensing a first pointer and a second pointer by the conducting wires to acquire the one-dimensional coordinates of the pointers and calculating the positions of the pointer images in the image sensing window of the image sensing apparatus when the first pointer and the second pointer touch the touch surface ~S1102 estimating the actual touch positions of the pointers based on the history data of the above positions and the above one-dimensional coordinates ~S1104

FIG. 11

TOUCH-CONTROL SYSTEM AND TOUCH-SENSING METHOD THEREOF

This application claims the priority benefit of Taiwan application serial no. 099105701, filed on Feb. 26, 2010. This application also claims the benefit of U.S. provisional patent application, Ser. No. 61/249252, filed on Oct. 06, 2009, the entire contents of which are hereby incorporated by reference.

BACKGROUND

1. Technical Field

The present invention generally relates to touch-control technologies and, particularly to a touch-control system and touch-sensing method thereof.

2. Description of the Related Art

FIG. 1 shows an isometric view of a touch-control system in prior art. Referring to FIG. 1, a touch-control system 100 is used for detecting the position of a pointer 102. The touch-control system 100 includes a panel 104, an image sensing apparatus 106, an image sensing apparatus 108 and a processing circuit 110. The touch-control system 100 further includes a reflector element 112, a reflector element 114 and a reflector element 116. A rectangular area labeled with label 18 is used as a sensing area of the touch-control system 100. The processing circuit 110 is electronically coupled to the image sensing apparatuses 106 and 108, so as to acquire the actual touch position of the pointer 102 according to the pointer images sensed by the two image sensing apparatuses. The description and the prior art recited in Taiwan patent No. 097126033 can be referred to obtain a detailed sensing theory and calculating method of the touch-control system 100. Here we will not go further on this issue.

FIG. 2 shows a schematic view of the touch-control system 100 used with single touch. In FIGS. 1 and 2, the objects of uniform labels represent one same element. In FIG. 2, the image sensing apparatus 106 can senses the pointer 102 along the sensing path 202, the image sensing apparatus 108 can senses the pointer 102 along the sensing path 204. Thus, the processing 110 only need to calculate the crossing point of the sensing paths 202 and 204, and the position of the pointer 102 can be acquired. However, when the touch-control system 100 is used with multi touch, some problems may appear. FIG. 3 is taken to explain the touch-control system 100 used with multi touch.

FIG. 3 shows a schematic view of the touch-control system 100 used with multi touch. In FIGS. 1 and 3, the objects of uniform labels represent one same element. In addition, labels 302 and 304 are both represent a pointer. In FIG. 3, the image sensing apparatus 106 can senses the pointers 302 and 304 respectively along the sensing paths 202 and 312, the image sensing apparatus 108 can senses the pointers 302 and 304 respectively along the sensing paths 204 and 314. However, due to the processing circuit 110 can acquire the positions of the pointers 302 and 304 by calculating the cross points of above sensing paths, thus, the process circuit 110 may taking the positions labeled by 306 and 308 for the positions of the pointers 302 ands 304, so that so-called ghost points are generated. Thus, the processing 110 can not accurately determine the actual touch position of the pointers 302 and 304.

BRIEF SUMMARY

Accordingly, the present invention is directed to a touch-control system, which can accurately judge the actual touch positions of pointers without impact of ghost point.

The present invention further is directed to a touch-sensing method of above touch-control system.

In an embodiment of the present invention, the touch-control system includes a touch-control panel, a first image sensing apparatus, a second image sensing apparatus and a processing circuit. The touch-control panel has a touch surface and adopts a touch-sensing structure. The touch-sensing structure comprises a plurality of first conducting wires paralleled to each other. The first and second image sensing apparatuses are both used for sensing a plurality of images of the touch surface. The processing circuit is electronically coupled to the first conductive wires, the first image sensing apparatus and the second image sensing apparatus. When a first pointer and a second pointer touch the touch surface, the processing circuit acquires the one-dimensional coordinates of the pointers as a first sensing result by the first conductive wires, and calculates possible touch positions of the pointers as a second sensing result based on the pointer images sensed by the first and second image sensing apparatuses; and further acquires the intersection of the first sensing result and the second sensing result, taking this intersection as the actual touch positions of the first and second pointers.

In an embodiment of the present invention, the touch-sensing structure further comprises a plurality of second conductive wires vertical to the first conductive wires, when the pointers touch the touch surface, the first conducting wires and the second conducting wires corresponding to the touch positions of the pointers are electronically coupled, so that the processing circuit acquires the positions of the pointers by the first and second conductive wires as a third sensing result, and the processing circuit further acquires an intersection of the second sensing result and the third sensing result, taking this intersection as the actual touch positions of the pointers.

In an embodiment of the present invention, another touch-control system includes a touch-control panel, an image sensing apparatus and a processing circuit. The touch-control panel has a touch surface and adopts a touch-sensing structure. The touch-sensing structure comprises a plurality of first conducting wires paralleled to each other and a plurality of second conducting wires paralleled to each other. The second conducting wires are vertical to the plurality of the first conducting wires. When a first pointer and a second pointer touch the touch surface, the first conducting wires and the second conducting wires corresponding to the touch positions of the pointers are electronically coupled. The image sensing apparatus is used for sensing an image of the touch surface. The processing circuit is electronically coupled to above first conductive wires, above second conductive wires and the image sensing apparatus. When the two pointers touch the touch surface, the processing circuit acquires the possible touch positions of the pointers by the first and second conducting wires as a first sensing result, and calculates the positions of the pointer images sensed by the image sensing apparatus in the image sensing window of the image sensing apparatus, and taking it as a second sensing result; and the processing circuit further acquires an intersection of the first sensing result and the second sensing result as the actual touch positions of the pointers.

In an embodiment of the present invention, another touch-control system includes a touch-control panel, an image sensing apparatus and a processing circuit. The touch-control panel has a touch surface and adopts a touch-sensing structure. The touch-sensing structure comprises a plurality of conducting wires paralleled to each other. The image sensing apparatus is used for sensing an image of the touch surface. The processing circuit is electronically coupled to above conductive wires and the image sensing apparatus. When a first pointer and a second pointer touch the touch surface, the processing circuit acquires the one-dimensional coordinates of the pointers by the conducting wires, and calculates the positions of the pointer images sensed by the image sensing apparatus in an image sensing window of the image sensing apparatus; the processing circuit further estimates the actual touch positions of the pointers based on the history data of above positions and above one-dimensional coordinates.

The present invention also provides a touch-sensing method of a touch-control system. The touch-control system includes a touch-control panel, a first type of sensing apparatus and a second type of sensing apparatus. The touch-control panel has a touch surface, and the first and second types of sensing apparatus are both used for acquiring the information related to the positions of the pointers in the touch surface. The touch-sensing method includes the following steps: when a first pointer and a second pointer touch the touch surface, acquiring a first sensing result by the first type of sensing apparatus sensing the two pointers, and acquiring a second sensing result by the second type of sensing apparatus sensing the pointers; and acquiring the intersection of the first sensing result and the second sensing result, taking this intersection as the actual touch positions of the pointers.

In an embodiment of the present invention, the touch-control panel adopts a touch-sensing structure. The touch-sensing structure comprises a plurality of first conducting wires paralleled to each other that belonging to the first type of sensing apparatus. The second type of sensing apparatus comprises a first image sensing apparatus and a second image sensing apparatus. The first and second image sensing apparatuses are used for sensing a plurality of images of the touch surface. The touch-sensing method includes the following steps: when a first pointer and a second pointer touch the touch surface, acquiring the one-dimensional coordinates of the pointers as a first sensing result by the first conductive wires, and calculating possible touch positions of the pointers as a second sensing result based on the pointer images sensed by the first and second image sensing apparatuses; and further acquiring the intersection of the first sensing result and the second sensing result, taking this intersection as the actual touch positions of the pointers.

In an embodiment of the present invention, the touch-sensing structure adopted by the touch-control system further comprises a plurality of second conducting wires paralleled to each other that belonging to the first type of sensing apparatus. The second conducting wires are vertical to the plurality of the first conducting wires. When above pointers touch the touch surface, the first conducting wires and the second conducting wires corresponding to the touch positions of the pointers are electronically coupled. Above touch-sensing method further includes the following steps: acquiring the possible touch positions of the pointers by the second conducting wires as a third sensing result, and acquiring an intersection of the third sensing result and the second sensing result as the actual touch positions of the pointers.

In an embodiment of the present invention, the touch-control panel adopts a touch-sensing structure. The touch-sensing structure comprises a plurality of first conducting wires paralleled to each other and a plurality of second conducting wires paralleled to each other that both belong to the first type of sensing apparatus. The second conducting wires are vertical to the plurality of the first conducting wires. When a first pointer and a second pointer touch the touch surface, the first conducting wires and the second conducting wires corresponding to the touch positions of the pointers are electronically coupled. The second type of sensing apparatus includes an image sensing apparatus used for sensing an image of the touch surface. The touch-sensing method includes the following steps: when the two pointers touch the touch surface, acquiring the possible touch positions of the pointers by the first and second conducting wires as a first sensing result, and calculating the positions of the pointer images sensed by the image sensing apparatus in the image sensing window of the image sensing apparatus, and taking it as a second sensing result; and acquiring intersection of the first sensing result and the second sensing result, taking this intersection as the actual touch positions of the pointers.

In an embodiment of the present invention, another touch-sensing method of a touch-control system is provided. The touch-control system includes a touch-control panel and an image sensing apparatus. The touch-control panel has a touch surface and adopts a touch-sensing structure. The touch-sensing structure comprises a plurality of conducting wires paralleled to each other. The image sensing apparatus is used for sensing an image of the touch surface. The touch-sensing method includes the following steps: when a first pointer and a second pointer touch the touch surface, acquiring the one-dimensional coordinates of the pointers by the conducting wires, and calculating the positions of the pointer images sensed by the image sensing apparatus in an image sensing window of the image sensing apparatus; and estimating the actual touch positions of the pointers based on the history data of above positions and above one-dimensional coordinates.

The present invention senses the touch position of the pointer by the cooperation of the touch-control panel and the image sensing apparatus. In other words, the present invention senses the touch position of the pointer by integrating a resistance sensing manner and an optical sensing manner in traditional touch-sensing technology. In the present invention, all of the project with two image sensing apparatuses and a plurality of the first conductive wires, the project with two image sensing apparatuses and a plurality of the first and second conductive wires, and the project with one image sensing apparatus and a plurality of the first and second conductive wires, acquire the intersection of the sensing results of the two sensing manners, and taking the intersection as the actual positions of pointers, so as to solve the ghost point problem. In the present invention, the projects with an image sensing apparatuses and a plurality of conductive wires paralleled to each other can be used to estimate the actual positions of pointers based on the history data of the sensing results of the two sensing manner, and the ghost point problem is avoided.

For above and another objectives, features, and advantages of the present invention being better understood and legibly, accompanying embodiments together with the drawings are particularized.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 shows a diagram of main process of a touch-sensing method in accordance with a first embodiment of present invention;

FIG. 7 shows a diagram of main process of a touch-sensing method in accordance with a second embodiment of present invention;

FIG. 9 shows a diagram of main process of a touch-sensing method in accordance with a third embodiment of present invention;

FIG. 11 shows a diagram of main process of a touch-sensing method in accordance with a fourth embodiment of present invention.

DETAILED DESCRIPTION

A First Embodiment:

FIG. 1 can be taken again to explain the touch-control system in the embodiment. Referring to FIG. 1 again, in the embodiment, the panel 104 is replaced with a touch-control panel, and the operation of the processing circuit 110 is changed. The touch-control panel includes a touch surface (described as follows) and adopts a touch sensing structure. The touch-sensing structure mainly includes a plurality of transverse conducting wires paralleled to each other and a plurality of longitudinal conducting wires paralleled to each other. Each of the transverse conducting wires is vertical to each of the longitudinal conducting wires. Any of the plurality of transverse conducting wires is not electronically coupled to any of the longitudinal conducting wires. When the pointer (or another object) touches the touch surface, the transverse conducting wire and the longitudinal conducting wire corresponding to the touch position of the pointer are electronically connected to each other. In addition, all of the plurality of transverse conducting wires and the plurality of longitudinal conducting wires are electronically coupled to the processing circuit 110 (the coupled relation is not shown).

Figure 4:
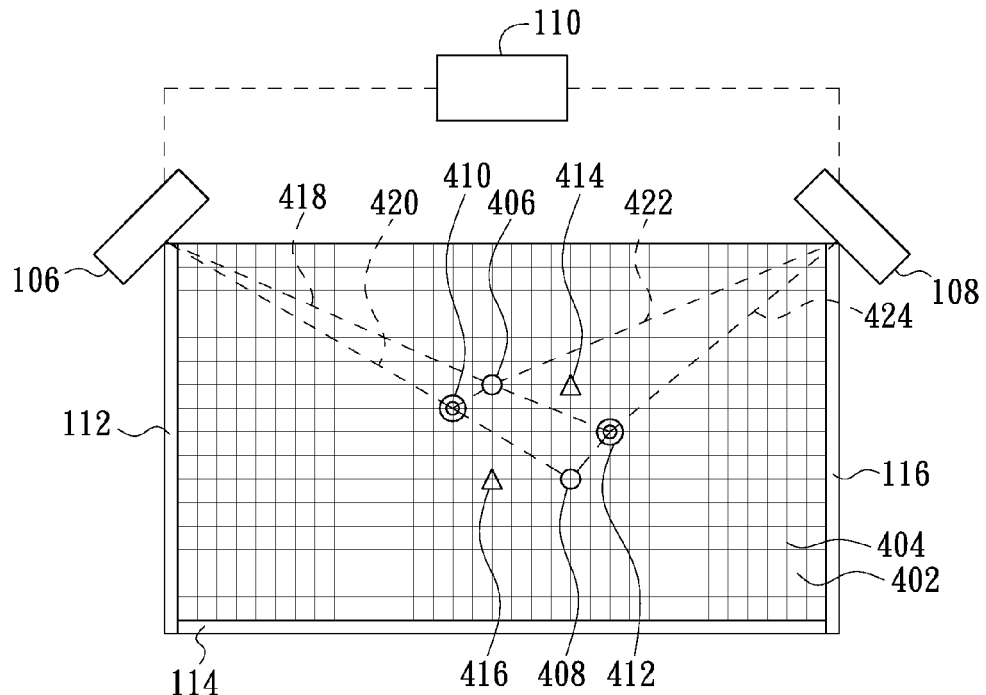
FIG. 4 shows a schematic view of the touch-control system with multi touch in accordance with a first embodiment of the present invention.

Therefore, for single touch, the processing circuit 110 can judge which two conductive wires are electronically coupled with each other through the structure of the touch-control panel, and further calculates the cross point of the two conductive wires to acquire the touch position of the pointer. The touch sensing structure is same with the sensing structure adopted by a resistance sensing manner in traditional touch sensing technology. The detailed sensing theory of this touch sensing structure is known by one skilled in the art. Here we will not go further on this point. FIG. 4 is taken to explain the operation of the processing circuit 110 in the embodiment.

Figure 1:
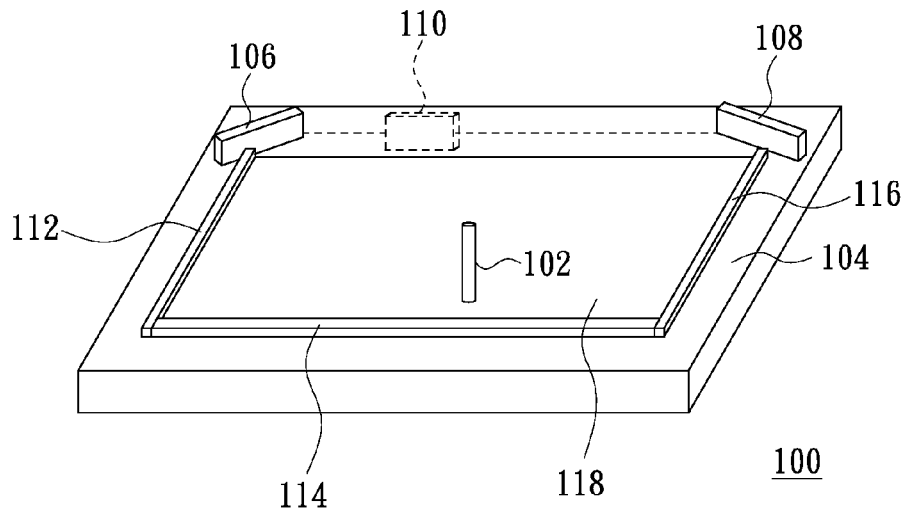
FIG. 1 shows an isometric view of a touch-control system in prior art.

FIG. 4 shows a schematic view of the touch-control system 100 used with multi touch. In FIG. 4, it takes two-point touch as an example. In FIGS. 1 and 4, the objects of uniform labels represent one same element. Label 402 represents the plurality of transverse conducting wires and Label 404 represents the plurality of longitudinal conducting wires. In addition, labels 406 and 408 are both represent a pointer. In addition, the quadrilateral area arranged with the plurality of transverse conducting wires 402 and the plurality of longitudinal conducting wires 404 represents the touch surface. In the embodiment, the touch surface is shaped in rectangular.

In FIG. 4, the processing circuit 110 can senses above two pointers through the plurality of transverse conducting wires 402 and the plurality of longitudinal conducting wires 404, so as to acquire the actual touch positions of the two pointers. In this situation, the processing circuit 110 can detect that two transverse conducting wires 402 are electronically coupled respectively to two longitudinal conducting wires 404, thus, the processing circuit 110 may judge that the locations labeled by 414 and 416 are possibly the touch positions of the pointers 406 and 408, and takes the crossing points of above four conducting lines (that is, the possible touch positions of the pointers 406 and 408) as a first sensing result.

In addition, the image sensing apparatus 106 can senses the pointers 406 and 408 respectively along the sensing paths 418 and 420, the image sensing apparatus 108 can senses the pointers 406 and 408 respectively along the sensing paths 422 and 424, thus, the processing circuit 110 further calculates the crossing points of above sensing paths, so as to acquire possible touch positions of the pointers 406 and 408. The processing circuit 110 may judge that the locations labeled by 410 and 412 are possibly the touch positions of the pointers 406 and 408, and takes the crossing points of above sensing paths (that is also the possible touch positions of the pointers 406 and 408) as a second sensing result.

In the first sensing result, there are only two crossing points being actual touch positions of the pointers 406 and 408, but the other crossing points are ghost points. In the second sensing result, there are also only two crossing points being actual touch positions of the pointers 406 and 408, but the other crossing points are ghost points. Therefore, the processing circuit 110 further obtains the intersection of the first sensing result and the second sensing result, so as to take this intersection as the actual touch positions of the pointers 406 and 408. Thus, the impact of the ghost points for the touch-control system can be eliminated, and the touch-control system may not make an error judgment of the positions of the pointers 406 and 408.

It needs to be pointed that, in an embodiment of present invention, each of above image sensing apparatuses includes an infra-red (IR) illuminating apparatus that exemplarily is an infra-red light-emitting diode (IR LED). Otherwise, each of above image sensing apparatuses can further includes an IR filter apparatus that exemplarily is an IR-pass filter, so that each of the image sensing apparatus can acquire an image of the touch surface through the IR filter apparatus thereof. Further, the reflector elements 112, 114 and 116 adopt a retro-reflective material to implement a reflecting function. The reflector elements 112, 114 and 116 in the invention is not limited to that, each the reflector elements 112, 114 and 116 can reflect light to the touch surface and without forming a mirror image of the touch surface. Of course, the reflector elements 112, 114 and 116 can be replaced with three illuminant elements that radiating light towards the touch surface.

From the embodiment, some basic operating steps of the touch-control system in the embodiment can be concluded, and FIG. 5 can be taken to explain that. FIG. 5 shows a process diagram of a touch-sensing method in accordance with an embodiment of present invention. The touch-sensing method is suitable for a touch-control system. The touch-control system comprises a touch-control panel, a first image sensing apparatus and a second image sensing apparatus. The touch-control panel has a touch surface, and adopts a touch-sensing structure. The touch-sensing structure comprises a plurality of first conducting wires paralleled to each other and a plurality of second conducting wires paralleled to each other. The second conducting wires are vertical to the plurality of the first conducting wires. When a pointer touches the touch surface, a first conducting wire and a second conducting wire corresponding to the touch position of the pointer are electronically coupled to each other. The first and second image sensing apparatuses are both used for sensing a plurality of images of the touch surface. The touch-sensing method includes the following steps: when a first pointer and a second pointer touch the touch surface, acquiring the possible touch positions of the pointers in the touch surface by the first and second conducting wires as a first sensing result, and calculating possible touch positions of the pointers based on the images of the pointers sensed by the first and second image sensing apparatus as a second sensing result (step S502); and acquiring intersection of the first sensing result and the second sensing result, taking this intersection as the actual touch positions of the pointers (step S504).

Figure 6:
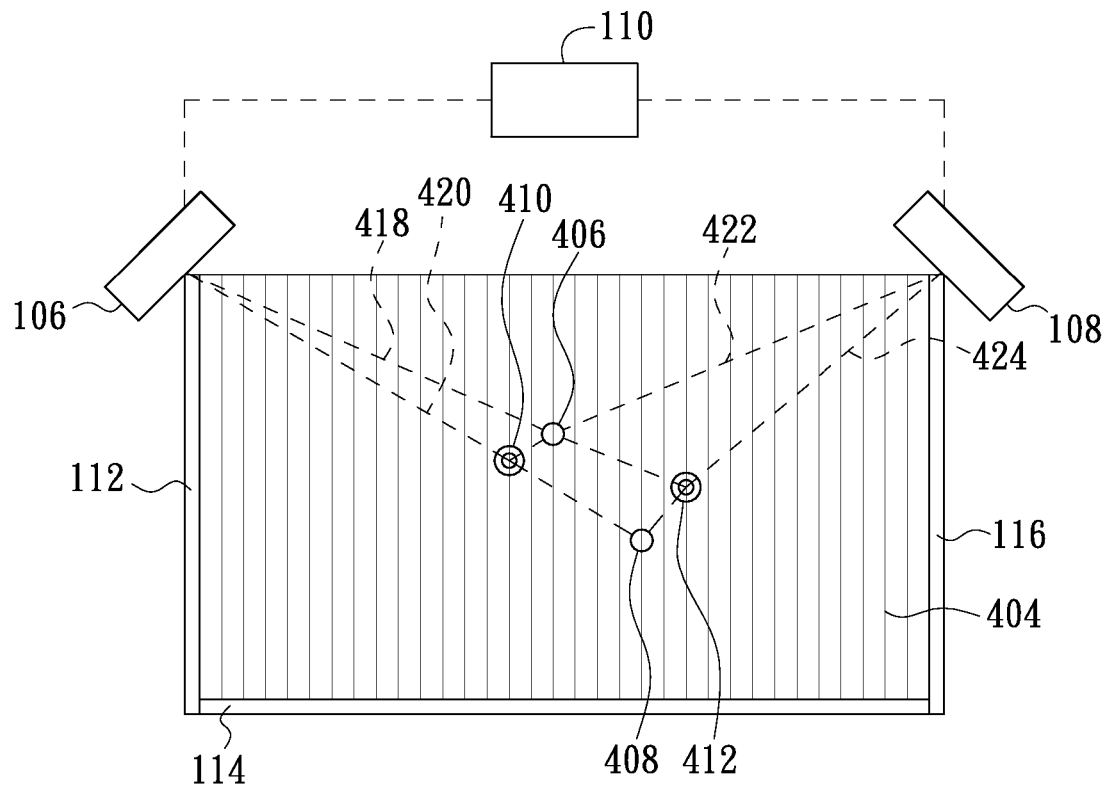
FIG. 6 shows a schematic view of the touch-control system with multi touch in accordance with a second embodiment of the present invention.

A Second Embodiment:

In the embodiment, another touch-control system is provided. The difference between this touch-control system and the touch-control system in the first embodiment is that, the touch-control panel of this touch-control system adopts another kind of touch-sensing structure that mainly includes a plurality of longitudinal conducting wires paralleled to each other. FIG. 6 is taken for explain the sensing manner of this touch-control system.

FIG. 6 shows a schematic view of the touch-control system used with multi touch in accordance with a second embodiment of the present invention. In FIG. 6, it takes two-point touch as an example for explanation. In FIGS. 1 and 6, the objects of uniform labels represent one same element. Label 404 represents the plurality of longitudinal conducting wires, and labels 406 and 408 are both represent a pointer. In addition, the quadrilateral area arranged with the plurality of longitudinal conducting wires 404 represents the touch surface. In the embodiment, the touch surface is shaped in rectangular.

In FIG. 6, the processing circuit 110 can senses above two pointers through the plurality longitudinal conducting wires 404, so as to acquire the one-dimensional coordinates of above two pointers as a first sensing result. Further, the processing 110 calculates the crossing points of the sensing paths 418, 420, 422 and 424, and the crossing pointers are taken as a second sensing result. The one-dimensional coordinates are the X coordinates of the actual touch positions of the pointers 406 and 408, and in the second sensing result, there are only two crossing points being actual touch positions of the pointers 406 and 408, but the other crossing points are ghost points. Therefore, the processing circuit 110 further obtains the intersection of the first sensing result and the second sensing result, so as to take this intersection as the actual touch positions of the pointers 406 and 408. Thus, the impact of the ghost points for the touch-control system can be eliminated, and the touch-control system may not make an error judgment of the positions of the pointers 406 and 408.

It needs to be pointed that, if the touch-sensing structure adopted by the touch-control panel in the embodiment mainly includes a plurality of transverse conducting wires paralleled to each other, the invention is also can be implemented.

From the embodiment, some basic operating steps of the touch-control system in the embodiment can be concluded, and FIG. 7 can be taken to explain that. FIG. 7 shows a process diagram of a touch-sensing method in accordance with an embodiment of present invention. The touch-sensing method is suitable for a touch-control system. The touch-control system comprises a touch-control panel, a first image sensing apparatus and a second image sensing apparatus. The touch-control panel has a touch surface, and adopts a touch-sensing structure. The touch-sensing structure comprises a plurality of first conducting wires paralleled to each other. The first and second image sensing apparatuses are both used for sensing a plurality of images of the touch surface. The touch-sensing method includes the following steps: when a first pointer and a second pointer touch the touch surface, acquiring the one-dimensional coordinates of the pointers by the above first conducting wires as a first sensing result, and calculating possible touch positions of the pointers as a second sensing result based on the pointer images sensed by the first and second image sensing apparatuses (step S702); and acquiring an intersection of the first sensing result and the second sensing result, taking this intersection as the actual touch positions of the pointers (step S704).

Figure 8:
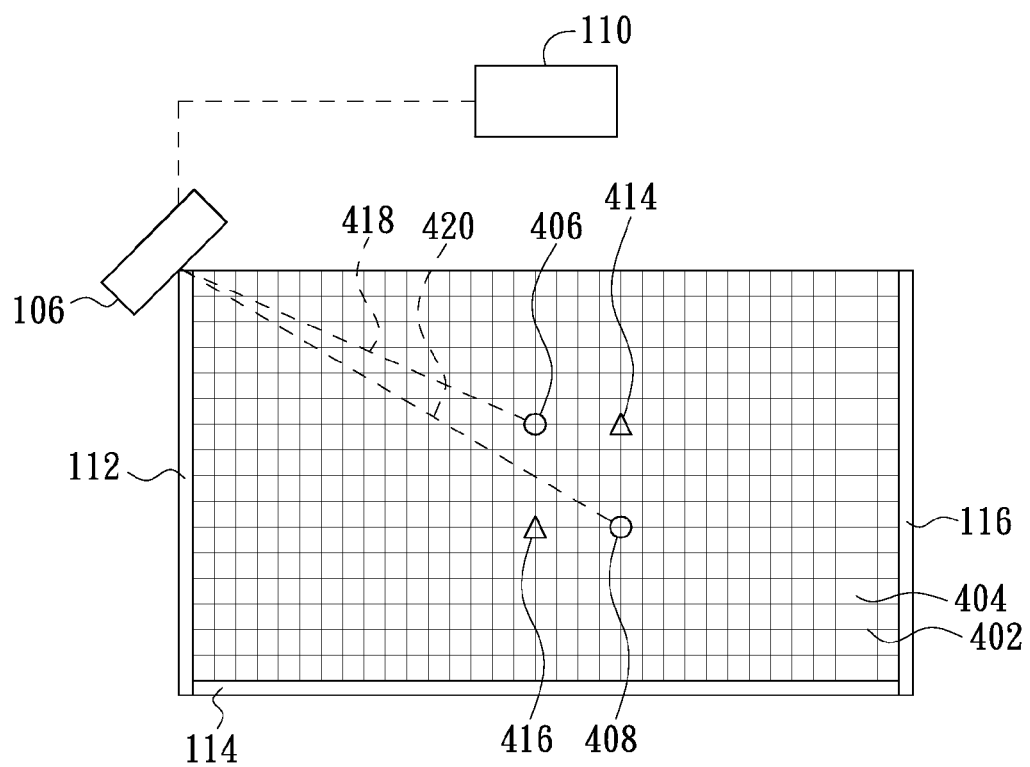
FIG. 8 shows a schematic view of the touch-control system with multi touch in accordance with a third embodiment of the present invention.

A Third Embodiment:

In the embodiment, another touch-control system is provided. The difference between this touch-control system and the touch-control system in the first embodiment is that, this touch-control system includes only one image sensing apparatus. FIG. 8 is taken for explain the sensing manner of this touch-control system.

FIG. 8 shows a schematic view of the touch-control system used with multi touch in accordance with a second embodiment of the present invention. In FIG. 8, it takes two-point touch as an example. In FIGS. 1 and 8, the objects of uniform labels represent one same element. Label 402 represents the plurality of transverse conducting wires and Label 404 represents the plurality of longitudinal conducting wires. In addition, labels 406 and 408 are both represent a pointer. In addition, the quadrilateral area arranged with the plurality of transverse conducting wires 402 and the plurality of longitudinal conducting wires 404 represents the touch surface. In the embodiment, the touch surface is shaped in rectangular.

In FIG. 8, the processing circuit 110 can senses above two pointers through the plurality of transverse conducting wires 402 and the plurality of longitudinal conducting wires 404, so as to acquire the actual touch positions of the two pointers as a first sensing result. The processing circuit 110 further senses above two pointers by the image sensing apparatus 106, so as to calculate the positions of the pointer images sensed by the image sensing apparatus 106 in an image sensing window (described as follows) of the image sensing apparatus 106, and the positions of the pointer images are taken as a second sensing result.

Figure 8A:
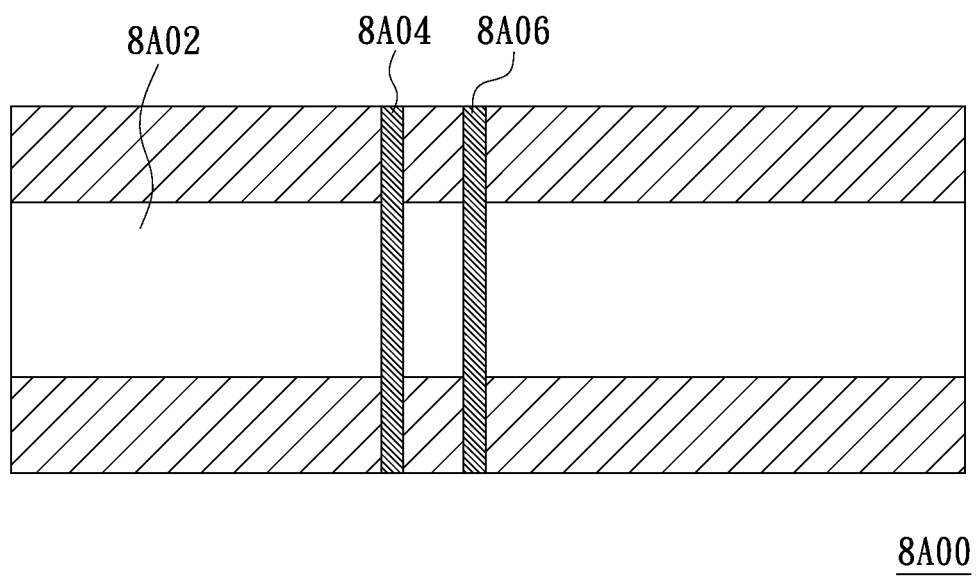
FIG. 8A shows a schematic view of an image sensed by the image sensing apparatus shown in FIG. 8.

FIG. 8A shows a schematic view of an image sensed by the image sensing apparatus shown in FIG. 8. In FIG. 8A, label 8A00 represents an image sensing window of the image sensing apparatus 106. Label 8A02 represents a bright zone with a relatively high brightness formed on the image by the reflector elements 114 and 116 reflecting light. The bright zone 8A02 is a main sensing area. Labels 8A04 and 8A06 respectively represent the dark stripes formed by the pointers 406 and 408, that is, the pointer images.

Referring to FIG. 8 again. In the first sensing result, there are only two crossing points being actual touch positions of the pointers 406 and 408, but the other crossing points are ghost points. In the second sensing result, the positions of the two dark stripes are the touch positions of the pointers 406 and 408. Therefore, the processing circuit 110 further obtains the intersection of the first sensing result and the second sensing result, so as to take this intersection as the actual touch positions of the pointers 406 and 408. Thus, the impact of the ghost points for the touch-control system can be eliminated, and the touch-control system may not make an error judgment of the positions of the pointers 406 and 408.

It needs to be pointed that, if the position of the image sensing apparatus 106 is changed from the top left corner of the touch surface to the top right corner of the touch surface, the invention is also can be implemented.

From the embodiment, some basic operating steps of the touch-control system in the embodiment can be concluded, and FIG. 9 can be taken to explain that. FIG. 9 shows a process diagram of a touch-sensing method in accordance with an embodiment of present invention. The touch-sensing method is suitable for a touch-control system. The touch-control system comprises a touch-control panel and an image sensing apparatus. The touch-control panel has a touch surface, and adopts a touch-sensing structure. The touch-sensing structure comprises a plurality of first conducting wires paralleled to each other and a plurality of second conducting wires paralleled to each other. The second conducting wires are vertical to the plurality of the first conducting wires. When a first pointer and a second pointer touch the touch surface, the first conducting wires and the second conducting wires corresponding to the touch positions of the pointers are electronically coupled. The image sensing apparatus is used for sensing an image of the touch surface. The touch-sensing method includes the following steps: when the two pointers touch the touch surface, acquiring the possible touch positions of the pointers by the first and second conducting wires as a first sensing result, and calculating the positions of the pointer images sensed by the image sensing apparatus in the image sensing window of the image sensing apparatus, and taking it as a second sensing result (step S902); and acquiring intersection of the first sensing result and the second sensing result, taking this intersection as the actual touch positions of the pointers (step S904).

Figure 10:
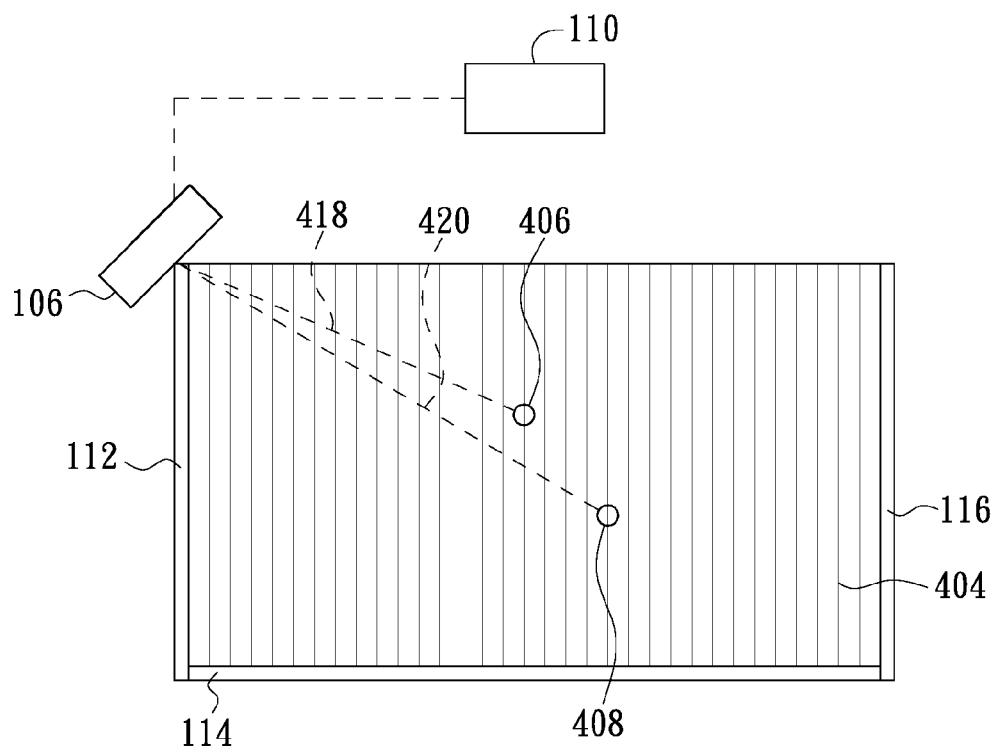
FIG. 10 shows a schematic view of the touch-control system with multi touch in accordance with a fourth embodiment of the present invention.

A Fourth Embodiment:

In the embodiment, another touch-control system is provided. The difference between this touch-control system and the touch-control system in the first embodiment is that, this touch-control system includes only one image sensing apparatus, and the touch-control panel of this touch-control system adopts another kind of touch-sensing structure that mainly includes a plurality of longitudinal conducting wires paralleled to each other. FIG. 10 is taken for explain the sensing manner of this touch-control system.

FIG. 10 shows a schematic view of the touch-control system used with multi touch in accordance with a second embodiment of the present invention. In FIG. 10, it takes two-point touch as an example. In FIGS. 1 and 10, the objects of uniform labels represent one same element. Label 404 represents the plurality of longitudinal conducting wires, and labels 406 and 408 are both represent a pointer. In addition, the quadrilateral area arranged with the plurality of longitudinal conducting wires 404 represents the touch surface. In the embodiment, the touch surface is shaped in rectangular.

In FIG. 10, the processing circuit 110 can acquire the one-dimensional coordinates of above two pointers through the plurality longitudinal conducting wires 404. The processing circuit 110 further senses above two pointers by the image sensing apparatus 106, so as to calculate the positions of the pointer images sensed by the image sensing apparatus 106 in the image sensing window of the image sensing apparatus 106. In this embodiment, the processing circuit 110 cannot acquire the actual touch positions of the pointers 406 and 408 by calculating the intersection of the sensing results of above two sensing manners. Thus, in the embodiment, the processing circuit 110 estimates the actual touch positions of the two pointers based on the history data of above positions and above one-dimensional coordinates. In addition, it can be obtained from FIG. 10 that, this touch-control system cannot generate ghost point, thus, the problem of ghost point is avoided.

It needs to be pointed that, if the position of the image sensing apparatus 106 is changed from the top left corner of the touch surface to the top right corner of the touch surface, the invention is also can be implemented. Otherwise, if the touch-sensing structure adopted by the touch-control panel in the embodiment mainly includes a plurality of transverse conducting wires paralleled to each other, the invention is also can be implemented.

From the embodiment, some basic operating steps of the touch-control system in the embodiment can be concluded, and FIG. 11 can be taken to explain that. FIG. 11 shows a process diagram of a touch-sensing method in accordance with an embodiment of present invention. The touch-sensing method is suitable for a touch-control system. The touch-control system comprises a touch-control panel and an image sensing apparatus. The touch-control panel has a touch surface, and adopts a touch-sensing structure. The touch-sensing structure comprises a plurality of conducting wires paralleled to each other. The image sensing apparatus is used for sensing an image of the touch surface. The touch-sensing method includes the following steps: when a first pointer and a second pointer touch the touch surface, acquiring the one-dimensional coordinates of the pointers by the above conducting wires, and calculating the positions of the pointer images sensed by the image sensing apparatus in the image sensing window of the image sensing apparatus(step S1102); and estimating the actual touch positions of the pointers based on the history data of above positions and above one-dimensional coordinates (step S1104).

In each of above embodiments, though the touch-control panel is taken for explanation, as known by one skilled in the art, the touch-control panel in above embodiment can also be a touch-control display panel.

Figure 2:
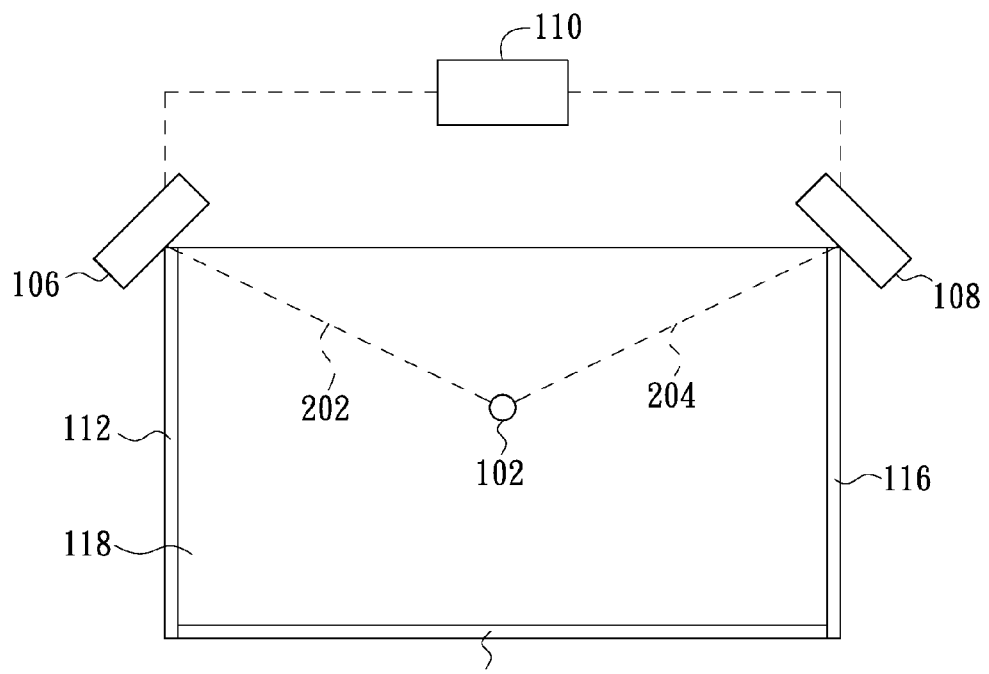
FIG. 2 shows a schematic view of the touch-control system with single touch in prior art.
Figure 3:
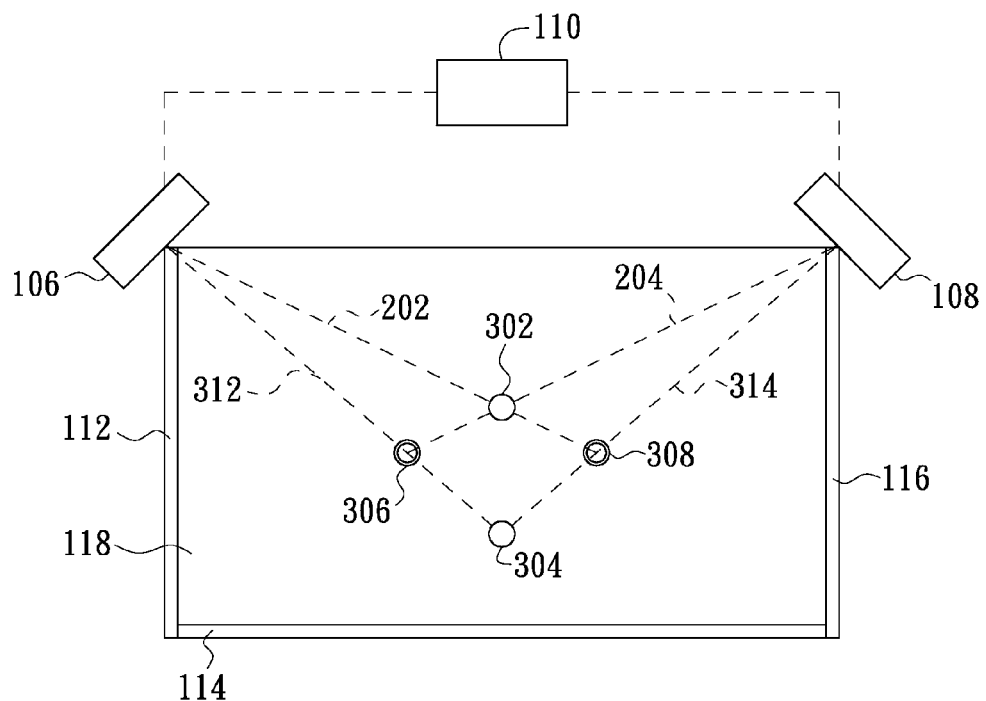
FIG. 3 shows a schematic view of the touch-control system with multi touch in prior art.
Figure 12:
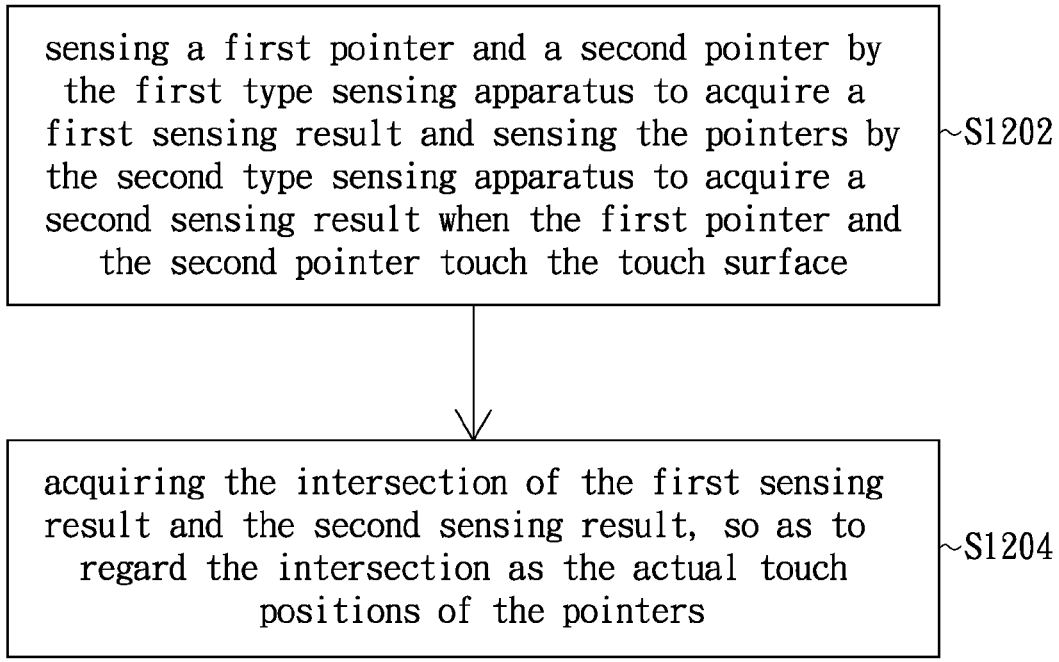
FIG. 12 shows a diagram of main process of a touch-sensing method in accordance with another embodiment of present invention.

Otherwise, a general touch-sensing method as shown in FIG. 2 is concluded by integrating the touch-sensing method in the first to third embodiments. FIG. 12 shows a process diagram of a touch-sensing method in accordance with an embodiment of present invention. The touch-sensing method is suitable for a touch-control system. The touch-control system comprises a touch-control panel, a first type of sensing apparatus and a second type of sensing apparatus. The touch-control panel has a touch surface, and the first and second types of sensing apparatus are both used for acquiring the information related to the positions of the pointers in the touch surface. The touch-sensing method includes the following steps: when a first pointer and a second pointer touch the touch surface, acquiring a first sensing result by the first type of sensing apparatus sensing the two pointers, and acquiring a second sensing result by the second type of sensing apparatus sensing the pointers (step S1202); and acquiring the intersection of the first sensing result and the second sensing result, taking this intersection as the actual touch positions of the pointers (step S1204).

In the embodiment, the first type of sensing apparatus can be the first conductive wires, the second conductive wires, or the first and second conductive wires stated in above embodiments, and the second type of sensing apparatus can be the image sensing apparatus 106, the image sensing apparatus 108, or the image sensing apparatuses 106 and 108. The cooperation of the first and second types of sensing apparatuses must exclude the situation in the fourth embodiment.

As stated above, the present invention senses the touch position of the pointer by the cooperation of the touch-control panel and the image sensing apparatus. In other words, the present invention senses the touch position of the pointer by integrating a resistance sensing manner and an optical sensing manner in traditional touch-sensing technology. In the present invention, all of the project with two image sensing apparatuses and a plurality of the first conductive wires, the project with two image sensing apparatuses and a plurality of the first and second conductive wires, and the project with one image sensing apparatus and a plurality of the first and second conductive wires, acquire the intersection of the sensing results of the two sensing manners, and taking the intersection as the actual positions of pointers, so as to solve the ghost point problem. In the present invention, the projects with an image sensing apparatuses and a plurality of conductive wires paralleled to each other can be used to estimate the actual positions of pointers based on the history data of the sensing results of the two sensing manner, and the ghost point problem is avoided.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch-control system, comprising:
   a touch-control panel having a touch surface and adopting a touch-sensing structure, the touch-sensing structure comprising a plurality of first conducting wires paralleled to each other;
   a first image sensing apparatus;
   a second image sensing apparatus, the first and second image sensing apparatus being used for sensing a plurality of images of the touch surface; and
   a processing circuit electronically coupled to the plurality of first conductive wires, the first and second image sensing apparatuses, when a first pointer and a second pointer touch the touch surface, the processing circuit acquiring the one-dimensional coordinates of the pointers by the first conducting wires as a first sensing result, the processing circuit calculating possible touch positions of the pointers based on the images of the pointers sensed by the first and second image sensing apparatus as a second sensing result, and further acquiring intersection of the first sensing result and the second sensing result, taking this intersection as the actual touch positions of the first and second pointers.

2. The touch-control system as claimed in claim 1, wherein the touch-sensing structure further comprising a plurality of second conductive wires vertical to the first conductive wires, when the pointers touch the touch surface, the first conducting wires and the second conducting wires corresponding to the touch positions of the pointers being electronically coupled, so that the processing circuit acquiring the positions of the pointers by the first and second conductive wires as a third sensing result, and the processing circuit further acquiring an intersection of the second sensing result and the third sensing result, taking this intersection as the actual touch positions of the pointers.

3. The touch-control system as claimed in claim 1, further comprising a first illuminant element, a second illuminant element and a third illuminant element, or further comprising a first reflector element, a second reflector element and a third reflector element, the touch surface is a quadrilateral including a first edge, a second edge, a third edge and a fourth edge connected in an order, the first image sensing apparatus being arranged at a corner crossed by the first edge and the fourth edge, the second image sensing apparatus being arranged at a corner crossed by the first edge and the second edge, wherein the first illuminant element, the second illuminant element and the third illuminant element respectively arranged in the second edge, the third edge and the fourth edge and radiating light towards the touch surface; or wherein the first reflector element, the second reflector element and the third reflector element respectively arranged in the second edge, the third edge and the fourth edge and used for reflecting light to the touch surface without forming a mirror image of the touch surface.

4. The touch-control system as claimed in claim 1, wherein each of the image sensing apparatuses includes an infra-red illuminating apparatus and an infra-red filter that only infra-red light can pass through, each of the image sensing apparatuses acquiring an image of the touch surface through the infra-red filter apparatus thereof, the infra-red illuminating apparatus comprising an infra-red light-emitting diode.

5. The touch-control system as claimed in claim 1, wherein the touch surface includes a touch-control display panel.

6. A touch-control system, comprising:
   a touch-control panel having a touch surface and adopting a touch-sensing structure, the touch-sensing structure comprising:
   a plurality of first conducting wires paralleled to each other; and
   a plurality of the second conducting wires vertical to the plurality of the first conducting wires, when a first pointer and a second pointer touch the touch surface, the first conducting wires and the second conducting wires corresponding to the touch positions of the pointers being electronically coupled;
   an image sensing apparatus used for sensing an image of the touch surface; and
   a processing circuit electronically coupled to the plurality of first and second conductive wires and the image sensing apparatuses, when the pointers touch the touch surface, the processing circuit acquiring the possible positions of the pointers by the first and second conducting wires to obtain a first sensing result, the processing circuit further calculating possible positions of the pointers based on the positions of the pointer images sensed by the image sensing apparatus in an image sensing window of the image sensing apparatus to obtain a second sensing result, and further acquiring an intersection of the first sensing result and the second sensing result, taking this intersection as the actual touch positions of the pointers.

7. The touch-control system as claimed in claim 6, further comprising a first illuminant element, a second illuminant element and a third illuminant element, or further comprising a first reflector element, a second reflector element and a third reflector element, the touch surface is a quadrilateral including a first edge, a second edge, a third edge and a fourth edge connected in an order, the image sensing apparatus being arranged at a corner crossed by the first edge and the fourth edge or a corner crossed by the first edge and the second edge, wherein the first illuminant element, the second illuminant element and the third illuminant element respectively arranged in the second edge, the third edge and the fourth edge and radiating light towards the touch surface; or wherein the first reflector element, the second reflector element and the third reflector element respectively arranged in the second edge, the third edge and the fourth edge and used for reflecting light to the touch surface without forming a mirror image of the touch surface.

8. The touch-control system as claimed in claim 6, wherein the image sensing apparatuses includes an infra-red illuminating apparatus and an infra-red filter that only infra-red light can pass through, the image sensing apparatus acquiring an image of the touch surface through the infra-red filter apparatus thereof, the infra-red illuminating apparatus comprising an infra-red light-emitting diode.

9. The touch-control system as claimed in claim 6, wherein the touch surface includes a touch-control display panel.

10. A touch-control system, comprising:
a touch-control panel having a touch surface and adopting a touch-sensing structure, the touch-sensing structure comprising a plurality of conducting wires paralleled to each other;
an image sensing apparatus used for sensing an image of the touch surface; and
a processing circuit electronically coupled to the plurality of conductive wires and the image sensing apparatus, when a first pointer and a second pointer touch the touch surface, the processing circuit acquiring the one-dimensional coordinates of the pointers by the conducting wires, and calculating the positions of the pointer images sensed by the image sensing apparatus in an image sensing window of the image sensing apparatus; and further estimating the actual touch positions of the pointers based on the history data of above positions and above one-dimensional coordinates.

11. The touch-control system as claimed in claim 10, further comprising a first illuminant element, a second illuminant element and a third illuminant element, or further comprising a first reflector element, a second reflector element and a third reflector element, the touch surface is a quadrilateral including a first edge, a second edge, a third edge and a fourth edge connected in an order, the image sensing apparatus being arranged at a corner crossed by the first edge and the fourth edge or a corner crossed by the first edge and the second edge, wherein the first illuminant element, the second illuminant element and the third illuminant element respectively arranged in the second edge, the third edge and the fourth edge and radiating light towards the touch surface; or wherein the first reflector element, the second reflector element and the third reflector element respectively arranged in the second edge, the third edge and the fourth edge and used for reflecting light to the touch surface without forming a mirror image of the touch surface.

12. The touch-control system as claimed in claim 10, wherein the image sensing apparatuses includes an infra-red illuminating apparatus and an infra-red filter that only infra-red light can pass through, the image sensing apparatus acquiring an image of the touch surface through the infra-red filter apparatus thereof, the infra-red illuminating apparatus comprising an infra-red light-emitting diode.

13. The touch-control system as claimed in claim 10, wherein the touch surface includes a touch-control display panel.

14. A touch-sensing method of a touch-control system, the touch-control system comprising a touch-control panel, a first type of sensing apparatus and a second type of sensing apparatus, the touch-control panel including a touch surface, the first and second types of sensing apparatus are both used for acquiring the information related to the positions of the pointers in the touch surface; the method comprising:
when a first pointer and a second pointer touch the touch surface, acquiring a first sensing result by the first type of sensing apparatus sensing the two pointers, acquiring a second sensing result by the second type of sensing apparatus sensing the pointers; and
acquiring an intersection of the first sensing result and the second sensing result, taking this intersection as the actual touch positions of the pointers.

15. The touch-sensing method as claimed in claim 14, wherein the touch-control panel comprises a touch-sensing structure that including a plurality of first conductive wires paralleled to each other, the first conductive wires belonging to the first type of sensing apparatus, the second type of sensing apparatus including a first image sensing apparatus and a second sensing apparatus, both the first and second image sensing apparatuses being used for sensing a plurality of images of the touch surface, the method comprising:
when a first pointer and a second pointer touch the touch surface, acquiring the one-dimensional coordinates of the pointers as a first sensing result by the first conductive wires, calculating possible touch positions of the pointers as a second sensing result based on the pointer images sensed by the first and second image sensing apparatuses; and
acquiring an intersection of the first sensing result and the second sensing result, taking this intersection as the actual touch positions of the pointers.

16. The touch-sensing method as claimed in claim 15, wherein the touch-sensing structure further comprising a plurality of second conductive wires vertical to the first conductive wires, the second conductive wires belonging to the first type of sensing apparatus, when the pointers touch the touch surface, the first conducting wires and the second conducting wires corresponding to the touch positions of the pointers being electronically coupled, the touch-sensing method further comprising:
acquiring the positions of the pointers by the first and second conductive wires as a third sensing result, and
acquiring an intersection of the second sensing result and the third sensing result, taking this intersection as the actual touch positions of the pointers.

17. The touch-sensing method as claimed in claim 15, wherein the touch-control panel adopts a touch-sensing structure including a plurality of first conductive wires paralleled to each other and a plurality of second conductive wires paralleled to each other, the first and second conductive wires belonging to the first type of sensing apparatus, the second conductive wires being vertical to the first conductive wires, when a first pointer and a second pointer touch the touch surface, the first conducting wires and the second conducting wires corresponding to the touch positions of the pointers being electronically coupled, the second type of sensing apparatus includes an image sensing apparatus used for sensing an image of the touch surface, the touch-sensing method comprising:
when the pointers touch the touch surface, acquiring possible touch positions of the pointers as a first sensing result by the first and second conductive wires, calculating the positions of the pointer images sensed by the image sensing apparatus in an image sensing window of the image sensing apparatus as a second result; and
acquiring an intersection of the first sensing result and the second sensing result, taking this intersection as the actual touch positions of the pointers.

18. A touch-sensing method of a touch-control system, the touch-control system comprising a touch-control panel and an image sensing apparatus, the touch-control panel including a touch surface and adopting a touch-sensing structure, the touch-sensing structure comprising a plurality of conductive wires paralleled to each other, the image sensing apparatus being used for sensing an image of the touch surface, the method comprising:

when a first pointer and a second pointer touch the touch surface, acquiring the one-dimensional coordinates of the pointers by the conductive wires, calculating the positions of the pointer images sensed by the image sensing apparatus in an image sensing window of the image sensing apparatus, and estimating the actual touch positions of the pointers based on the history data of above positions and above one-dimensional coordinates.

* * * * *